April 26, 1960
J. H. GROVES
2,934,236
CONTAINER SIDE SEAM
Filed April 21, 1955
FIG. 1
FIG. 2
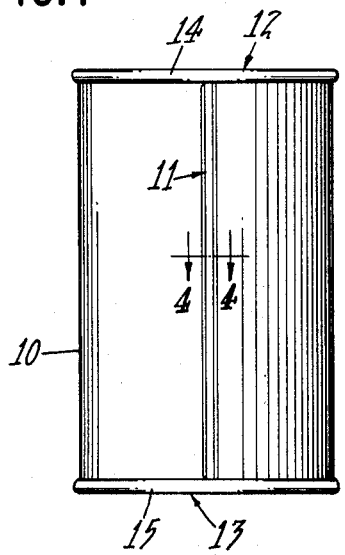
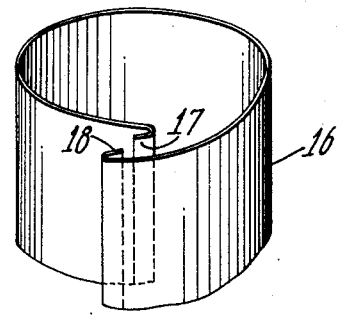
FIG. 4
FIG. 5
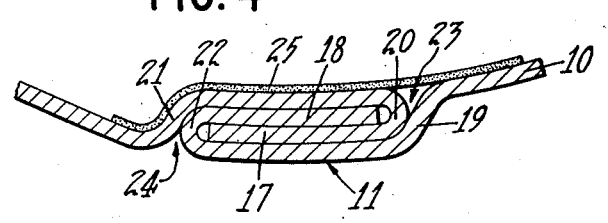
FIG. 6
FIG. 3
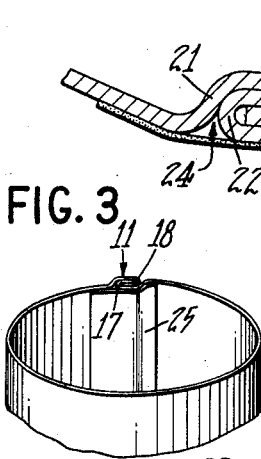
FIG. 7
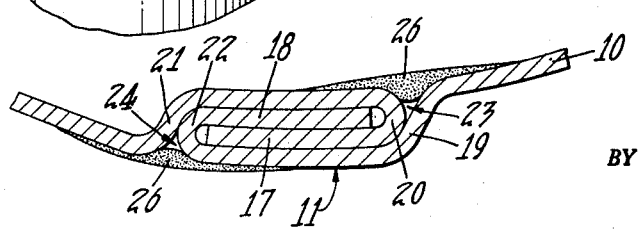
INVENTOR.
JAMES H. GROVES
BY Charles H. Erne
Leland R. McCann
George W. Reiber
ATTORNEYS

United States Patent Office 2,934,236
Patented Apr. 26, 1960

2,934,236
CONTAINER SIDE SEAM

James H. Groves, Lombard, Ill., assignor to American Can Company, New York, N.Y., a corporation of New Jersey Application April 21, 1955, Serial No. 502,761

1 Claim. (Cl. 220—81)

The present invention pertains to a hermetic, solderless side seam of a sheet metal can or container, and more particularly to a side seam composed at least in part of a lock seam, i.e. reversely bent, interlocked body hooks, bonded by an organic adhesive placed in a novel location.

Sheet metal containers having their side seams bonded by means of a nonmetallic, organic adhesive or cement are well known in the art. In these prior art containers, the cement is distributed throughout the side seam much in the same manner as is metallic solder, i.e. around and between the layers of metal forming the side seam. Tests have shown that cans having a side seam cemented in this manner are considerably weaker in blow-up strength than soldered cans.

Although these cemented cans are well suited for certain uses, they are inadequate for holding products developing relatively high internal pressure. High internal pressure imposes a stress on the interlocked body hooks of the side seam which tends to unfold the hooks. This tendency of the hooks to unfold or separate when subjected to unfolding stress is especially pronounced in a half-in-half-out side seam, i.e. the can body wall on each side of the side seam is bent so as to lie close to the base of a hook, which is the type of seam most generally used in cemented side seam cans.

I have discovered that if a layer of organic adhesive or cement is disposed over the outside or inside of a can side seam comprising reversely bent, interlocked body hooks, or over both outside and inside of the seam, a side seam having much greater resistance to unfolding stress results, thereby producing a side seam cemented can having a blow up strength approaching and in certain instances exceeding that of a soldered can. The cement may be used as a fillet just bridging the gap or groove between one hook of the side seam and the adjacent body wall portion from which the other hook extends or a film of cement may cover the entire side seam extending a short distance onto the body wall on each side of the seam. It is essential however that in either construction the above mentioned gap or groove is bridged. Since in the instant invention the cement is disposed externally of the metal folds of the side seam, the thickness and position of cement used is not especially limited, i.e., thicker or thinner layers and outside and/or inside layers of cement may be used depending on the strength desired. This choice of cement layer thickness and position provides an additional advantage. A dimension and position of cement layer may be adopted to provide for maximum protection of the can and its contents as well as strength depending upon the source of attack against can or contents.

It is therefore an object of the present invention to provide a sheet metal container having an improved strength, solderless side seam bonded with an organic cement.

A further object of the present invention is to provide a sheet metal can body having a solderless side seam bonded by means of the novel placement of an organic adhesive.

Still another object of the present invention is to provide a side seam for a sheet metal container bonded with a nonmetallic cement having an unfolding strength comparable to that of a solder bonded side seam.

Yet another object of the present invention is to provide a sheet metal container having a high strength, solderless side seam bonded with an organic cement giving increased protection against deterioration of the container and/or its contents.

An additional object of the present invention is to provide a sheet metal container having a solderless side seam bonded with an organic adhesive suitable for holding products generating a relatively high internal pressure.

Numerous other objects and advantages of the invention will be apparent as it is better understood from the following description, which, taken in connection with the accompanying drawings, discloses a preferred embodiment thereof.

Figure 1 is a side elevational view of a container embodying the instant invention;

Fig. 2 is an enlarged, fragmentary perspective view of a partially formed container body showing the relation of its side seam hooks just prior to their interengagement to produce a side seam;

Fig. 3 is an enlarged, fragmentary perspective view of one end of a completed can body showing in particular the inner surface of the body adjacent the side seam;

Figure 4 is an enlarged sectional view of the side seam of the container taken substantially along line 4—4 of Fig. 1; and Figs. 5 to 7 inclusive are sectional views similar to Fig. 4 but showing modified forms of the invention.

As a preferred or exemplary embodiment of the instant invention the drawings illustrate a sheet metal can comprising a body 10 (Fig. 1) having a lock side seam 11 and upper and lower end members 12, 13 joined to the body 10 in a conventional manner as by upper and lower end seams 14, 15 respectively.

Finished body 10 preferably is made from a one-piece blank initially bent to produce a partially formed body 16 (Fig. 2) of tubular configuration, the side seam marginal edge portions of which are reversely bent to form opposed inner and outer side seam hooks 17, 18 respectively. In a well known manner, hooks 17, 18 are interengaged and bumped as by means of a spline and hammer to interlock them thereby producing the lock seam 11 having two internal and two external layers and extending the full height of the can body.

The spline and hammer used in the bumping operation are of such configuration so as to bend a portion of the body wall on each side of the side seam 11. Body wall portion 19 (Fig. 4) carrying outer hook 18 is bent inwardly so as to be close to the bend 20 of inner hook 17; and body wall portion 21 carrying inner hook 17 is bent outwardly so as to be close to the bend 22 of outer hook 18. This side seam construction produces a substantially V-shaped groove or gap 23 between wall portion 19 and the inner hook bend 20 opening into the interior of the can and extending the full length of the side seam and a similarly shaped groove 24 extending the length of seam 11 between wall portion 21 and outer hook bend 22 and opening to the outside of the can body.

A film 25 of synthetic resin cement or adhesive is situated on the inside of the can body covering the entire length and width of side seam 11 as best shown in Fig. 3. Cement film 25 extends laterally from each side of the side seam and onto the adjacent body wall so as to bridge gap 23 and terminate on the can body wall adjacent and beyond wall portion 19 on one side of seam 11 and to terminate adjacent and beyond wall portion 21 on the other side of seam 11. The purpose of extending film 25 over and beyond wall portion 21 is for the protection both of the side seam against corrosion and the product against contamination. However, film 25 must extend over at least about half the width of the side seam on one side of the groove and an equal distance over the body wall on the other side of the groove so as to be firmly anchored to the surfaces adjacent each side of the groove.

The thickness of the cement layer bridging the groove 23 must be at least 3 mils, i.e. 0.003 inch. It has been found that strength or resistance to unfolding of the side seam increases as the thickness of the cement film or layer is increased. Therefore, the maximum thickness of film 25 is limited only by the economics of increased material cost compared to strength desired and the ability to fabricate a finished container from a can body having a very thick film over its side seam. For the purpose of the present invention, a practicable upper limit of film thickness has been found to be about 12 mils.

It is necessary that film 25 have both cohesive or tensile strength and good adherence to the surface of the can body wall and the seam 11 with which it is in contact. The tensile strength must be at least 1500 pounds per square inch. The adherence of the cement to any particular surface can generally be regulated or improved by the use of adhesion promoters or intermediate coatings. Therefore, any resinous material having the necessary cohesive or tensile strength and the ability to form a self-supporting film is suitable for use in the present invention. Examples of useful synthetic resinous materials are: polyamide adhesive such as those formed from copolymers of polymeric fatty acids and alkylene polyamines, e.g. those described in United States Patent 2,379,413 to T. F. Bradley, copolymers of dicarboxylic acids and alkylene diamines as described in United States Patent 2,130,948 to W. H. Carothers, polymeric amino-carboxylic acids such as those disclosed in United States Patent 2,071,253 to Carothers; phenolic resins such as those derived from polyhydroxy phenols and epichlorohydrin disclosed in United States Patent 2,503,726 to S. O. Greenlee; oriented linear polyester resins such as those sold under the trade name of Mylar; high molecular weight vinyl halide resins such as highly polymerized vinyl chloride (Marvinol), and polyvinylidene chloride (Saran).

In order to obtain the desired thickness of film 25, it is necessary to apply the cement to the side seam area in a 100% solids form. If it were attempted to deposit the cement on the side seam area from a solution thereof in a volatile solvent, the maximum film thickness that could be obtained by this means would be no more than about ⅓ that necessary for the instant invention and most probably much less. Also, because of their fluidity, solvent solutions tend to creep away from and leave bare any projections or corners in the seam. Further attempts to deposit a thick film of resin from a solvent solution causes the solvent to become entrapped within the body of the film making removal thereof practically impossible.

Any suitable method of applying 100% solids resinous material may be used. Among these methods may be cited: ejecting the resin in a molten state from a nozzle of the desired size and configuration; extruding a resin layer onto the side seam area through a suitable orifice; or securing to the side seam area a preformed shape of resin such as a tape of the desired dimensions by means of pressure and/or heat.

The modified form of the present invention shown in Fig. 5 is similar to the embodiment shown in Fig. 4 except that the film 25 of cement is disposed over the side seam 11 on the outside of the can body. In this embodiment film 25 covers the side seam 11 for its full length and extends laterally on one side thereof across groove 24 beyond and adjacent body wall portion 21 and on the other side of the seam beyond and adjacent wall portion 19. By this construction, wall portion 21 is constrained against movement away from the bend 22 of outer hook 18 when an unfolding stress is exerted on the side seam.

The modified form shown in Fig. 6 illustrates the placement of film 25 of cement over the side seam area on both the inside and outside of the can body, and has the combined effect of the cement placement in Figs. 4 and 5 to produce a seam having the greatest strength. If desired, the two separate layers of cement may be composed of different materials. Also, in this modification and in that shown in Fig. 5, the cement layer on the outside of the can body may be decorated in some manner as by a pigment so as to give it a pleasing appearance in addition to its ability to strengthen and protect the side seam.

In the embodiment illustrated in Fig. 7, each of grooves 23 and 24 is bridged by a fillet 26 of cement which does not completely cover side seam 11 as in the embodiments shown in Figs. 4, 5 and 6 but merely extends a short distance on each side of the groove. The side seam may have a fillet of cement on each side thereof as shown in Fig. 7 or only one fillet may be present in the seam on either side thereof comparable to the placement of the cement film in Figs. 4 and 5. The presence of a cement fillet both inside and outside of the seam produces a stronger side seam than when the fillet is on one side only.

As with the film 25 of cement, the cross-sectional thickness of the cement fillet 26 in the groove must be at least 3 mils thick and it must extend a distance on each side of the groove equal to about half the width of the side seam. However, due to the method of applying the cement forming fillet 26, i.e. usually as a filament having a substantially circular cross-section, the cement often flows into and at least partially fills the groove 23 or 24. This results in a fillet 26 having at least if not more than the required minimum cross-sectional thickness without the presence of excess cement on the surface of the side seam to cause difficulties in fabrication of the finished container.

Although, in the description of the above embodiments, there has been no disclosure of a material within the folds of metal in the side seam, such a material may or may not be present as desired. In either event, the strength of the side seam is increased by the construction of the instant invention. It has been found that a stronger seam results by the bonding thereof with a layer, i.e. fillet or film, of cement according to the subject construction without the presence of a nonmetallic material within the folds than when such a material is present within the side seam folds.

Table I gives data comparing the strength obtained by constructing the side seam according to the instant invention using a cement film as shown in Figs. 4, 5 and 6 with the strength obtained in a low tin (5% or less tin) solder bonded side seam and a side seam having an organic cement within its folds only, i.e. only between the layers of the seam. The cement between the layers is a polyamide resin composition described in Groves and Wilson copending application Serial No. 395,264 filed November 30, 1953. The cement film is an adhesive composition derived from polymerized 11-amino undecanoic acid described in the above mentioned United States Patent 2,071,253.

*Table 1*

| Bonding Agent | Pounds Pull on ¾" Section to Cause Unfolding |
| --- | --- |
| Solder in folds | 226 |
| Cement in folds | 92.3 |
| Cement in folds+3 mil film outside only | 136.5 |
| Cement in folds+3 mil film inside only | 133 |
| Cement in folds+3 mil film outside and inside | 147.5 |
| Nothing in folds, 3 mil film outside and inside | 195 |
| Cement in folds+9 mil film outside only | 216.3 |
| Cement in folds+9 mil film inside only | 178.5 |
| Cement in folds+9 mil film outside and inside | 317.5 |
| Nothing in folds, 9 mil film outside and inside | 335.5 |

In addition to the half-in-half-out seam construction shown in the drawings and described above, the present invention is also applicable to other types of lock side seams; for example an inside seam in which only the body wall forming the continuation of the inner hook is bent to lie close to the bend of the outer hook; or an outside lock side seam in which only the body wall forming the continuation of the outer hook is bent to lie close to the bend of the inner hook.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A solderless hermetic side seam for a can body comprising interlocked inner and outer reversely bent body hooks extending longitudinally of said can body, the can body wall extending from said inner hook being bent outwardly to lie close to the bend of said outer hook to form a groove between said inner hook extension and said outer hook bend on the outside of said can body, the can body wall extending from said outer hook being bent inwardly to lie close to the bend of said inner hook to form a groove between said outer hook extension and said inner hook bend on the inside of said can body, said grooves extending the length of the interlocked body hooks, and a preshaped layer of a synthetic resin cement at least 3 mils thick and deposited in 100% solids form bridging at least one of said grooves and extending substantially through the length thereof, said resinous cement layer having a tensile strength of at least 1500 pounds per square inch and having lateral margins not less than about one-half the width of said seam adhesively bonded and anchored to the marginal surfaces of said body wall and seam on opposite sides of said groove, whereby said anchored cement layer prevents said interlocked hooks of the seam from unfolding when said can body is subjected to high internal pressure and hermetically seals said side seam.

References Cited in the file of this patent

UNITED STATES PATENTS

| | | |
|---|---|---|
| 2,138,807 | O'Neil | Nov. 29, 1938 |
| 2,178,618 | Taylor | Nov. 7, 1939 |
| 2,747,345 | Plastino | May 29, 1956 |

FOREIGN PATENTS

| | | |
|---|---|---|
| 870,731 | France | Dec. 22, 1941 |
| 52,694 | Holland | June 15, 1942 |